(12) United States Patent
Panabaker

(10) Patent No.: US 7,620,784 B2
(45) Date of Patent: Nov. 17, 2009

(54) HIGH SPEED NONVOLATILE MEMORY DEVICE USING PARALLEL WRITING AMONG A PLURALITY OF INTERFACES

(75) Inventor: Ruston Panabaker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 158 days.

(21) Appl. No.: 11/450,015

(22) Filed: Jun. 9, 2006

(65) Prior Publication Data

US 2007/0288687 A1    Dec. 13, 2007

(51) Int. Cl.
*G06F 12/00* (2006.01)
(52) U.S. Cl. .................... 711/157; 711/5; 711/103; 711/149
(58) Field of Classification Search .............. 711/149, 711/157, 5, 103
See application file for complete search history.

(56) References Cited

U.S. PATENT DOCUMENTS

| | | | | |
|---|---|---|---|---|
| 5,663,901 A | * | 9/1997 | Wallace et al. | 365/52 |
| 5,701,516 A | * | 12/1997 | Cheng et al. | 710/22 |
| 6,957,293 B2 | * | 10/2005 | Moertl et al. | 710/310 |
| 6,965,527 B2 | * | 11/2005 | Fasoli et al. | 365/189.01 |
| 7,017,037 B2 | * | 3/2006 | Fortin et al. | 713/2 |

* cited by examiner

*Primary Examiner*—Stephen C Elmore
*Assistant Examiner*—Mark A Giardino, Jr.
(74) *Attorney, Agent, or Firm*—Workman Nydegger

(57) ABSTRACT

Described is a high speed nonvolatile memory device and technology that includes a controller coupled via interfaces to sets of nonvolatile storage, such as separate flash memory chips or separate regions of a single chip. The controller includes logic that processes write requests of arbitrary size, by interleaving writes among the interfaces, including by parallel writing among the interfaces. For example, the data may be received via direct memory access (DMA) transfers. The controller maintains information to allow the interleaved data to be reassembled into its correct relative locations when read back, such as by DMA. The high speed nonvolatile memory device thus provides a hardware device and software solution that allows a personal computer to rapidly boot or resume from a reduced power state such as hibernation. The high speed nonvolatile memory device also may be used for other data storage purposes, such as caching and file storage.

18 Claims, 5 Drawing Sheets

HIGH SPEED NONVOLATILE MEMORY DEVICE USING PARALLEL WRITING AMONG A PLURALITY OF INTERFACES

BACKGROUND

When booted, contemporary personal computers often take approximately twenty seconds to load the operating system before the user can begin working on a task. This long delay annoys users, and sometimes causes users to not bother starting a computer when another means to accomplish the task can be used, thereby limiting the personal computer's usefulness.

To avoid having to boot a computer to use its functionality, various solutions have been introduced, such as having the computer enter a standby state (e.g., an ACPI S3 sleep state) following its prior use. In the standby state, some power is provided to the system memory to retain the memory contents. While standby allows the personal computer to relatively quickly resume to its useful state, standby has the drawback of draining the battery when in the sleep mode, and therefore is not always desirable. The standby mode also loses data if power is lost, which means that even desktops or plugged-in laptops can lose data during a power failure.

Another solution to provide for rapid startup is referred to as hibernate (e.g., an ACPI S4 state), in which the contents of the memory are transferred to a hard disk hibernation file upon hibernation, and read back from the hibernation file upon resuming to the normal operating state. This solution also has drawbacks, including that it takes a relatively long time to resume, as the hibernation file needs to be transferred back from the relatively slow hard disk drive into system memory and unpacked.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a high speed nonvolatile memory device that includes a controller coupled via interfaces to sets of nonvolatile storage, such as separate flash memory chips or separate regions of a flash memory chip. The controller includes logic that processes write requests of essentially any arbitrary size, by interleaving writes among the interfaces, including by parallel writing among the interfaces when appropriate. For example, the data may be received via direct memory access (DMA) transfers, and written as block writes to flash. The controller maintains information in association with the write request to allow the interleaved data to be reassembled into its correct relative locations when later read back.

When the controller receives a read request, the controller processes the read request by using the maintained information to determine how the data corresponding to the request was interleaved and stored. The data is then returned by reading back each block (or other subset) from the appropriate interface by which it was written. For example, the data may be returned via DMA transfers.

Among other benefits, the high speed nonvolatile memory device thus provides a hardware device and software solution that allows a personal computer to rapidly boot or resume from hibernation or other reduced power state, thus making a personal computer more like consumer electronics devices with respect to start up times, for example. The high speed nonvolatile memory device also may be used for other data storage purposes, such as caching and file storage during normal operation, such as to provide additional memory that is faster than hard disk swapping. Because the controller handles the translation between the nonvolatile memory and rest of the computer system, an arbitrary amount of data can be saved via a single request, without special formatting by the data source, thereby facilitating rapid operation.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
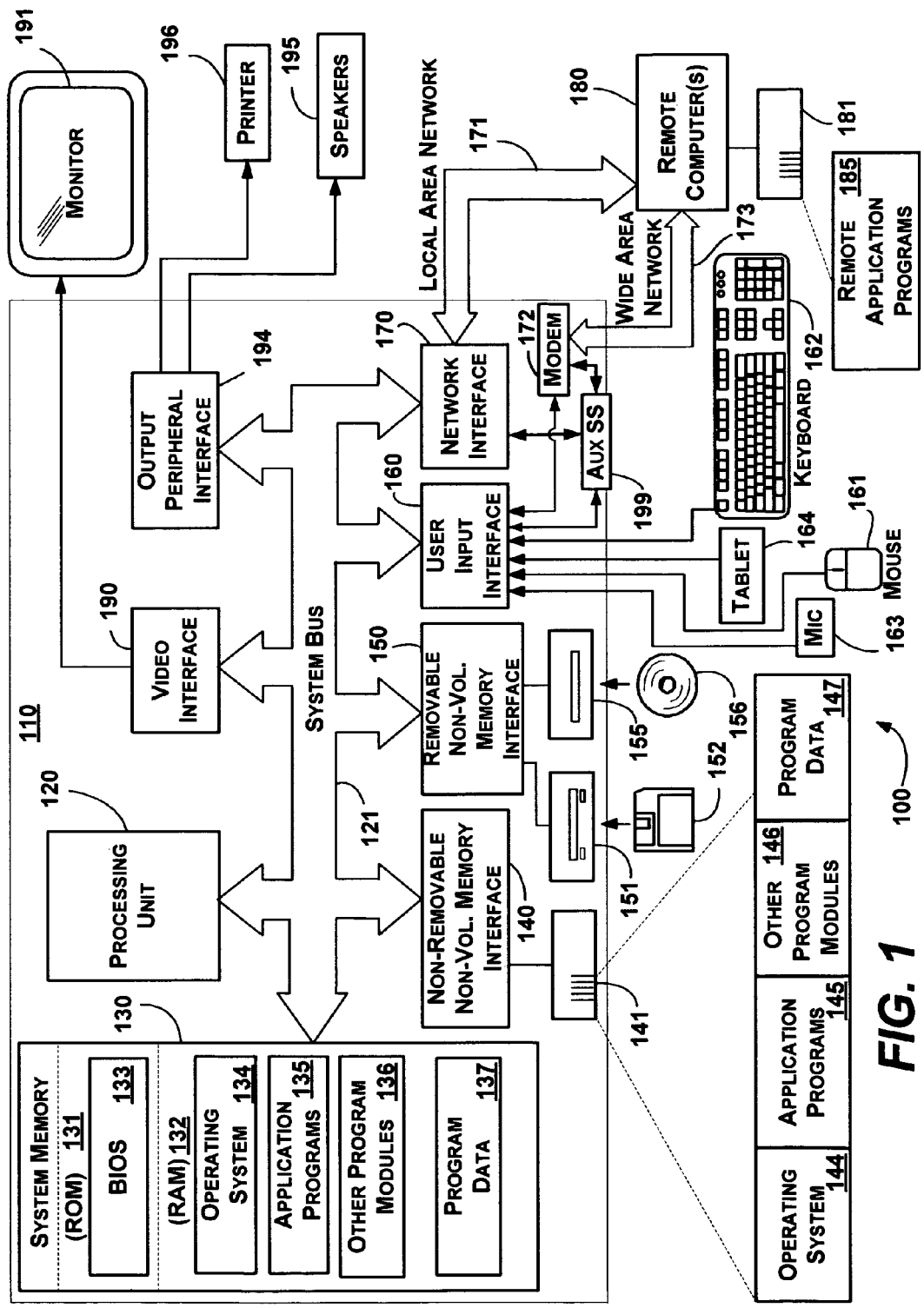
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention also may be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 also may be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

An auxiliary display subsystem 199 may be connected via the user interface 160 to allow data such as program content, system status and event notifications to be provided to the user, even if the main portions of the computer system are in a low power state. The auxiliary display subsystem 199 may be connected to the modem 172 and/or network interface 170 to allow communication between these systems while the main processing unit 120 is in a low power state.

High Speed Nonvolatile Memory Device

Various aspects of the technology described herein are directed towards a nonvolatile memory device that among other uses, provides for fast boot-up or resume from hibernation. As will be understood, however, the technology described herein is not limited to any particular uses or type of sleep states, e.g., other states between fully powered-on and fully powered-off may benefit from such a device, and general use while in an operation state to aid in performance is possible. As such, the present invention is not limited to the examples, usage models, structures or functionality described herein. Rather, any of the usage models, examples, structures or functionality described herein are non-limiting, and the present invention may be used various ways that provide benefits and advantages in computing and data storage in general.

Figure 2:
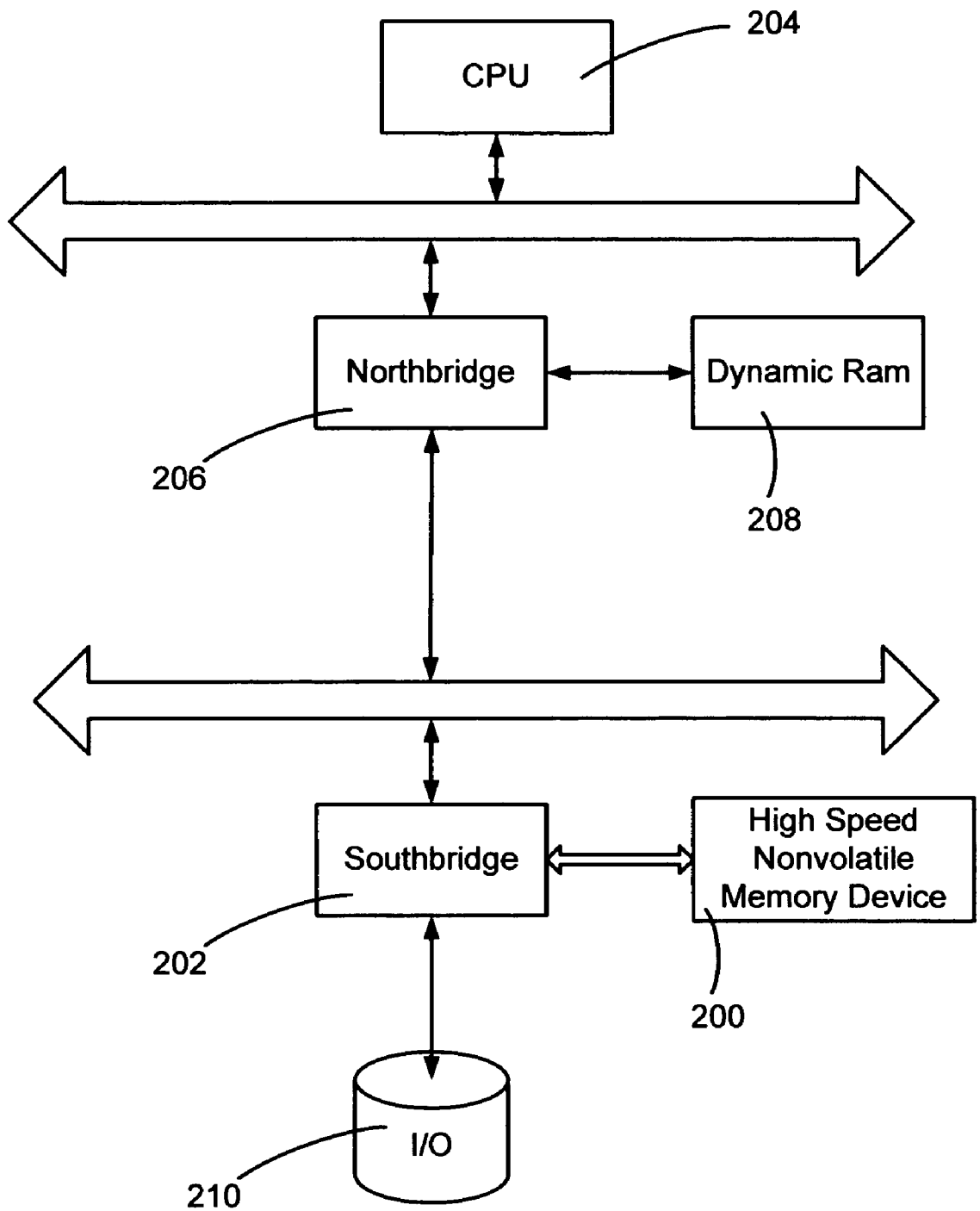
FIG. 2 is a representation of an example personal computer system architecture in which a high speed nonvolatile memory device is present.

In one example implementation generally represented in FIG. 2, one part of the technology described herein is incorporated into high speed nonvolatile memory device 200 that couples to the Southbridge component 202 of a typical Northbridge/Southbridge chipset. As is known in such an architecture, (which may correspond to the computer system 110 of FIG. 1) the CPU 204 couples through a bus and a Northbridge component 206 to dynamic ram 208. In turn the Northbridge component 206 couples to the Southbridge component 202 through another bus, which couples to I/O devices. A hard drive 210 along with the high speed nonvolatile memory device 200 are exemplified as connected I/O devices, although numerous other types of devices may be connected. For example, for expandability purposes, in some example architectures the Southbridge 202 has an interface for coupling PCI Express® (PCIe) components to the computer system, and this is one way in which a high speed nonvolatile memory device such as the device 200 may be coupled. Alternatives to desktop-type (e.g., PCIe cards) for coupling a high speed nonvolatile memory device include components such as mini-pci, PCMCIA, and Express cards, component packages that are made to plug into a dedicated connector, or even more directly coupling (e.g., soldering) a device to the motherboard. Essentially any ways and/or means of coupling a nonvolatile memory device to a computer system that is sufficient with respect to the desired high speed are equivalent.

Figure 3:
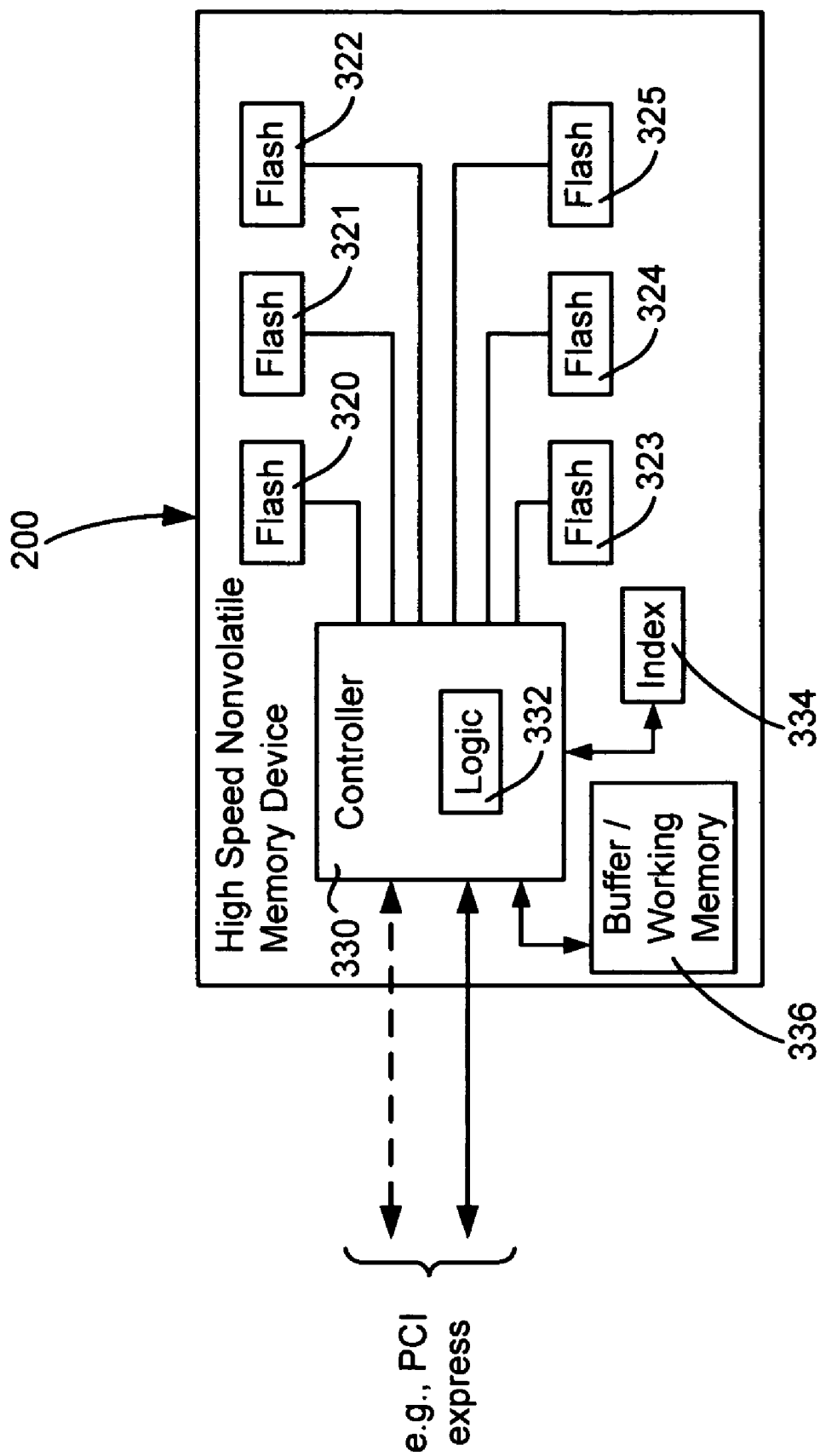
FIG. 3 is a representation of an example high speed nonvolatile memory device.

FIG. 3 shows one example of the high speed nonvolatile memory device 200, which includes flash memory devices 320-325. As will be understood, the device is faster than conventional flash devices via interleaving techniques that allow essentially parallel read and write operations to occur. Although flash memory (e.g., NAND-based or NOR-based) is shown, it is understood that any nonvolatile storage means may be used instead of or in addition to flash memory, including battery backed up RAM. Although in FIG. 3, six such flash devices 320-325 are exemplified, it is understood that the memory device 200 can contain any practical number of flash chips or the like.

Further, it is understood that a device manufacturer can implement the device in a single integrated circuit package, and/or also may provide parallel interfaces to a more combined set of flash memory, e.g., one set of flash memory with six parallel interfaces to separate regions is essentially equivalent to six individual flash chips each with their own interface. In other words, instead of having multiple, separate flash memory devices 320-325 or the like, it is essentially equivalent to have a single memory device with internally parallel regions that can be accessed simultaneously, each via a separate interface or the like. For example, a NOR type device having a relatively much faster interface may provide multiple regions of the chip that can be read and written simultaneously. As used herein, the term "interface" with respect to flash memory includes any mechanism for communicating with a set of flash memory, including a set of flash memory comprising an independent flash device or a set of flash memory comprising a separately accessible region of a flash device.

To achieve desirable high-speed operation, the memory device 200 includes a controller 330. The controller 330 includes logic 332 that among other things, understands how to write to the flash and read from the flash in a manner that corresponds to the flash interface/protocol and to the external interface/protocol on which data destined for the flash is received and on which data read from the flash is sent. In other words, the controller logic in part acts as a translator between the transfer mechanism and the nonvolatile memory. In the example of FIG. 3, an external interface/protocol is based on the PCIe standard, however it can be readily appreciated that virtually any suitable data communications mechanism and corresponding protocol may be used, e.g., a SATA (Serial Advanced Technology Attachment)—based bus interface and protocol. Further, note that at least one data line is required, but there may be more in a given configuration, as indicated by the dashed line to and from the controller 330, e.g., multiple PCIe lines may transfer the data.

A controller such as the controller 330 may be implemented in various ways. For example, a controller may have its logic hardwired, such as in a relatively straightforward high speed nonvolatile memory device that has a simple interleaving strategy that is effective for large block transfers. Such a controller may be optimized for gaining performance for a task like hibernation file storage and restoration. A more complex controller that is flexible to store boot data, hibernation files, regular files and/or can act as a cache, (and possibly can perform memory management techniques such as wear leveling) may be coded in flash so that updates may be made to the controller logic as necessary or desired. The controller may be capable of satisfying many read or write operations simultaneously. Still further, a controller may be dynamic in that it can detect or be informed as to how many I/O data lines (e.g., PCIe lines) are in use and adapt its operation accordingly. Similarly, a controller may be coded such that it adapts to how many flash interfaces and/or how much flash size is available, so that a manufacturer can use the same controller with different flash configurations, including configurations that a user may expand by adding (or modify by removing) flash devices. A controller may also detect or otherwise be informed of at least one other high-speed nonvolatile memory device, and can communicate and coordinate data reading and writing with the other device's controller, such as to allow for expanding the amount of high-speed nonvolatile memory by simply adding a second card or the like. For example, in a two device system, one controller can let the other controller process a predetermined (e.g., negotiated) half of the DMA transfers to and from its flash storage, thereby doubling the overall speed (assuming the DMA channel is not full).

Essentially the controller 330 writes to and reads from the flash devices 320-325 in parallel, maintaining an index 334 to track which data is written to which flash locations. Note that the index 334 (as well as possibly the logic 330) may be maintained within flash memory, such as within a certain location in one of the flash devices 320-325. The controller 330 may also have a high speed buffer working memory 336 for use as a temporary index in normal operation, with the contents persisted to flash index 334 as needed to prevent data loss. For example, high speed reads may be accomplished by first copying indexing information from flash to a high speed buffer/working memory 336, and then accessing the high speed buffer/working memory 336 for setting up data transfers rather than reading from slower flash for each data transfer. Also, as described below, the index data may be kept in working memory 336 until persisted to flash upon successful write of an entire set of data to be written, rather than upon each partial write or some smaller group of partial writes.

As represented in FIG. 3, each memory device 320-325 can be essentially simultaneously accessed by the device's controller 330, which allows the cumulative data rate to be very high, including when the device 200 uses DMA techniques to transfer large blocks of data into main system memory 208 (FIG. 2). Note that writing to the device 200 may be considerably slower than reading, as non-volatile memory technology is presently slower at writing. For example, this is true of NAND Flash, as well as for OneNAND type hybrid memories that read much faster than standard NAND.

In one implementation, the memory device 200 is configured as a block access device, with the controller logic 332 configured to transfer as much data as quickly as possible, e.g., by DMA. To this end, the controller keeps track of which blocks are in each memory device in the index 334. Moreover, the controller 330 can manage which device gets which part of the data, whereby the data provider need not be concerned with formatting block sizes, matching data to allocation unit boundaries, and so forth. Instead, the controller logic 332 breaks up a large write request as desired, such as to maximize parallel writing and reading back, as well as performing other memory management techniques such as wear-leveling.

By way of example logic, consider a relatively large (e.g., two-megabyte) data write request being received by the controller 330 from some data source 402 (FIG. 4), with some number of flash interfaces (e.g., one for each of devices 320-325) available, each of which are configured for writing two kilobyte blocks at a time. Although not explicitly shown in FIG. 4, the controller logic 332 may perform checks and the like, such as to ensure that the write request is not too large given the amount of available memory, and/or also may flush any cached data to the hard drive to make room, e.g., a program's temporarily cached data may be flushed to a hard disk to make room for a hibernation file.

Figure 4:
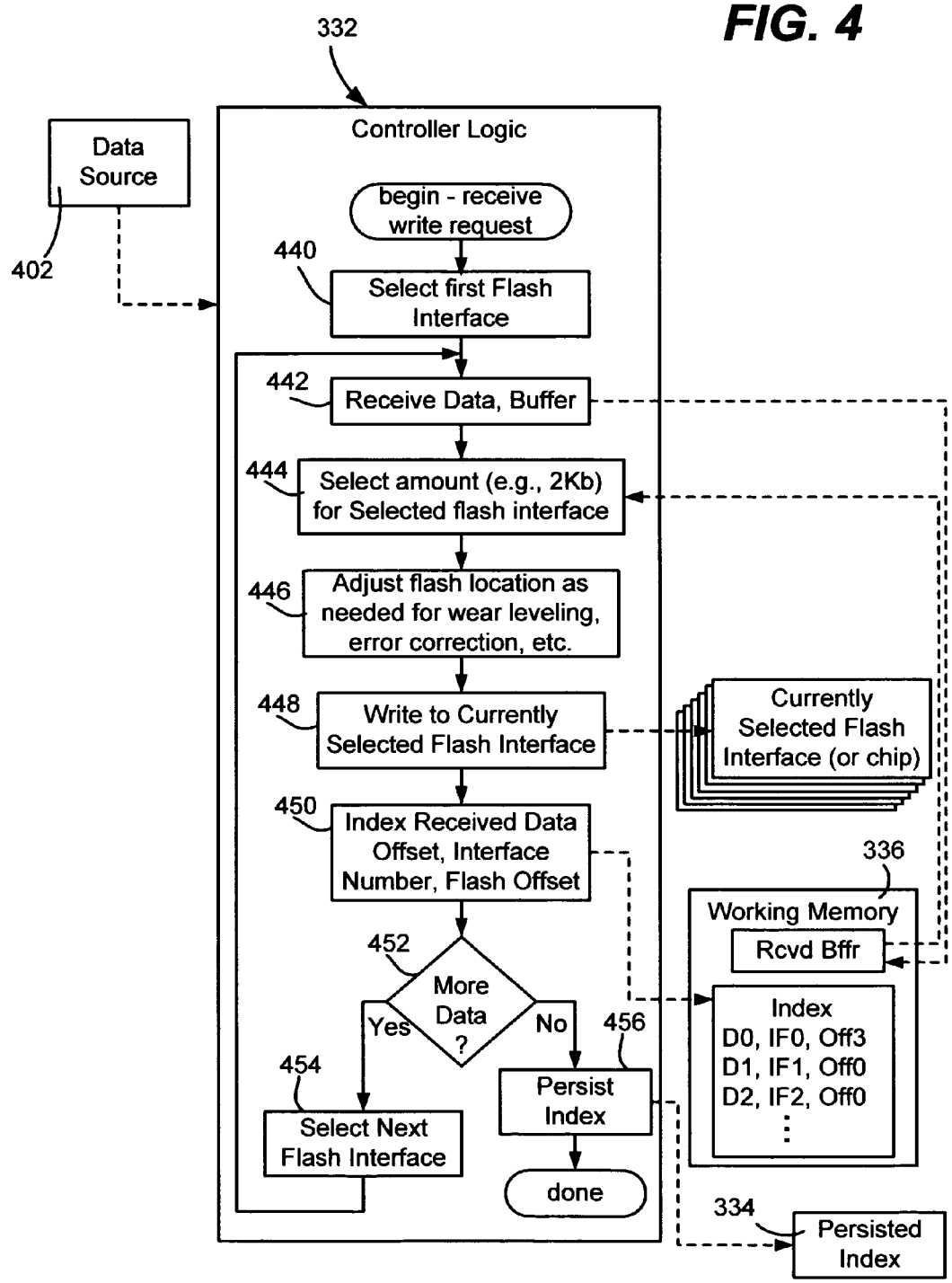
FIG. 4 is a representation of an example high speed nonvolatile memory device, including example steps performed by controller logic therein to write data to nonvolatile storage.

As exemplified in FIG. 4, the controller logic 332 interleaves the data so that the blocks are written in parallel to the available separate flash interfaces, e.g., the first flash interface is selected (step 440) for writing the first two kilobytes thereto, the next two kilobytes to the flash chip 321, and so forth. To this end, the controller may buffer the data as it is received (steps 442 and 444), which may occur independently (and in parallel) to the rest of the steps until the buffer is full.

As can be readily appreciated, by having a buffer large enough to handle the data for each block, e.g., at least twelve kilobytes for six flash chips that are written two blocks at a time, plus perhaps an additional amount to start collecting the next block while a full set of writes are occurring, the amount of parallel writing is essentially maximized. The controller outputs a busy or the like when its buffer is full.

At step 448, when at least a block-sized amount of data is buffered, the logic writes the appropriately-sized block from the buffer to a location in the currently selected flash interface, and then the next block to a location in the next flash interface when currently selected and so on. Each time a block is successfully written, at step 450 the index 334 is updated so that the data can be later reassembled upon a read request. For example, a received data offset or corresponding ordering information, an interface identifier (e.g., which flash chip) and an offset location into the flash would suffice as basic index record for each block that is written; also associated with the index would be any information needed to return the data to its appropriate location, e.g., file attributes if saving files. Note that if random access to the data is not required, e.g., the data is only allowed to be read back sequentially, the data offset/ordering information may be inherent, e.g., if the index 334 is ordered such that blocks of data are recorded in order, then the received data offset or ordering information need not be maintained. However, this would mean that the controller may have to adjust the ordering in the event the timing changes, e.g., due to bad writes.

Still further, a predefined convention may be used instead of or in conjunction with an indexing scheme. For example, the first 2 kilobyte block may be written to one flash device at one starting offset, the next 2 kilobyte block to the next flash device at its starting offset, and so forth. With such a convention, only the starting flash device and starting offset for each flash device need be recorded, which may, for example, be in a header or the like at the start of the data, (e.g., as six pointers, one for each device). This would save space over an indexing scheme. Exceptions may be recorded in the event that the predefined convention needs to be modified, e.g., for wear-leveling, error correction and the like. For example, a compressed-type indexing scheme may be used, in which instead of indexing each offset, the offset can be left blank whenever it meets the convention, that is, unless it is something other than two kilobytes from the previous offset.

Note that the example logic in FIG. 4 includes a step 446 by which the offset location into the currently selected flash interface (and if necessary the flash interface itself) may be changed. Reasons for not having the locations advance linearly may include performing wear-leveling techniques, performing any error correction (e.g., to bypass known bad blocks), and also to ensure that any reserved flash areas, such as reserved for persisting the index and possibly any for storing logic (or updates/extensions to otherwise persisted logic) are not overwritten.

As described above, step 448 represents the writing, with step 450 representing the indexing. These two steps are essentially transactional in nature, such that, for example, data corresponding to a write is not committed to the index until the write is successful, e.g., in case the write needs to be re-attempted to a different block due to a bad block being detected. Note that while this write is occurring, the controller does not wait when more data is available (step 452), and instead selects the next flash interface (step 454) for writing the next block of data. Essentially, the controller collects data until its receive buffer is full, and performs writes to flash until all (or some desired number of) flash interfaces are occupied, only delaying writes when the desired number of its flash interfaces are in use.

When no data remains to be written, step 452 branches to step 456 where the index 334 is persisted in association with the now written data. Incomplete writes thus may be prevented, by discarding the index before persisting. This also provides for faster speed, as the index 334 may be temporarily kept in a very high speed SRAM or DRAM memory until persisted when the full write is complete. If successfully persisted, a success or the like is returned, otherwise an errorcode is returned. Note that incomplete writes may be allowed by persisting indexing information for any successful writes before all the data is written, although persisting the index to flash more frequently than once per entire data write (e.g., once per block write) will slow down the device.

Figure 5:
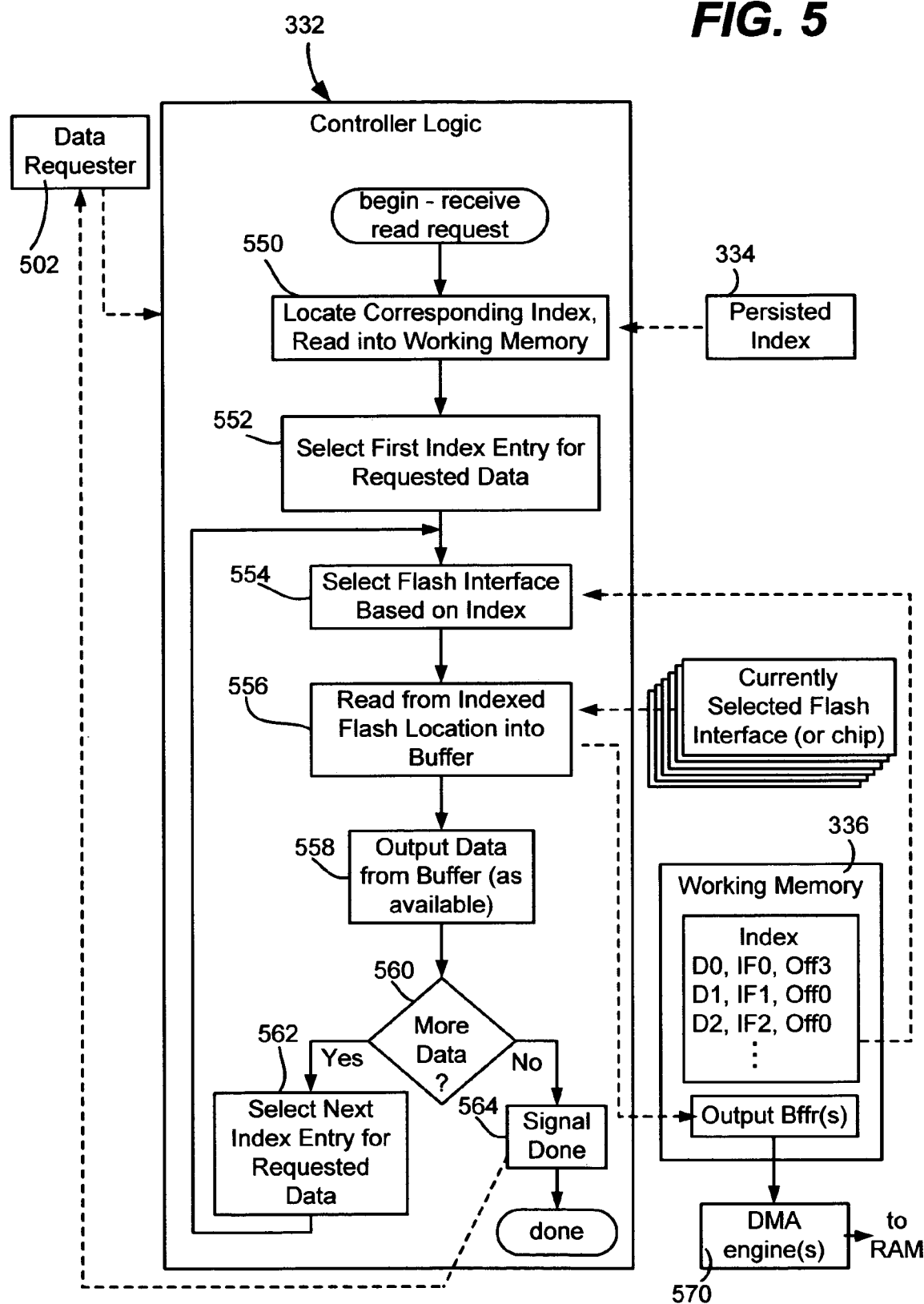
FIG. 5 is a representation of an example high speed nonvolatile memory device, including example steps performed by controller logic therein to read data from nonvolatile storage.

FIG. 5 represents example logic for handling a read request from some data requester. The request may be essentially any kind, e.g., read a file, read from a cache, read part of an "open" file, and so forth, but for purposes of this example will be generally described as a sequential block data transfer, such as to read out a hibernation file from start to end.

Step 550 represents locating the corresponding (e.g., persisted) index for this request, and if not already in working memory, may read the index 334 into the working memory 336. Note that there may be different indexes depending on what data is stored, e.g., one per file.

Step 552 represents selecting the first index entry for this request. Note that the indexed may have been saved in a manner that reflects the order in which the data was received, in which event there is no reason to sort or otherwise determine which index entry is first. In the event of a random access read from some offset, the first set of data to read may be determined by the starting offset value, whereby the controller logic 332 may scan the index's data to locate exactly which two kilobyte block contains the first set of requested data, and perform the math to determine the exact byte within that block to start returning.

Steps 554 and 556 are directed to reading from the correct flash interface (or device) at the correct location, which is determined via the index data. The data is read from flash into an output buffer (e.g., in the working memory 336), with the contents of the buffer output (e.g., via a DMA engine for the device 200 or for each interface) at step 558 as data is made available via the flash reads. Because flash reads can take a long time relative to outputting the data via DMA/PCIe, the controller does not output data (and if necessary may signal busy to facilitate asynchronous operation) when no data is available. Note that reads from other flash interfaces are performed in parallel via steps 560 and 562, by looping back to step or otherwise move through the index (steps 552 and 554) to read back the correct data into the output buffer for transferring back to the correct locations. Note that multiple DMA engines 570 (e.g., one per flash device) may be set up to control the bus to accomplish the transfers, and may reside in the device 200, in the Southbridge 202, and/or as independent components, and such engines may be controlled by the device controller 330, the BIOS and/or the CPU 204. For example, with the high speed memory device 200 of FIG. 3, six separate, parallel DMA transfers may be set up and take place at any given time until the requested data is fully transferred back into the main memory (e.g., the RAM 208, FIG. 2).

When all data has been transferred back, e.g., via DMA, the controller can signal a "done" status at step 564, such as via a "success" errorcode or the like. For multiple requests, an identifier for each request (virtual block) may be returned, e.g., read request X (corresponding to write request X as identified at the time of writing) was successfully transferred back into memory. In this manner, the requester knows that the correct data is now in RAM, regardless of how the flash was accessed, e.g., in terms of order read back from flash, different read speeds between devices, and so forth. At this time, the data requester 502 knows that all requested data is in the correct RAM memory location. A timeout or non-success errorcode may be detected by the requester in the event of a failure.

Turning to an example of using the exemplified hardware implementation of the high speed memory device 200 along with a software solution to boot a computer system faster, on cold boot from fully powered-off (e.g., ACPI S5 state), the device 200 may hold all (or most) of the files and other information needed for boot. These files may be transferred by DMA (direct memory access) into a RAM disk configured in system memory, and the computer system booted from the RAM disk. As can be readily appreciated, this allows the needed files to be accessed much faster than could be done from a conventional hard disk drive.

An alternative instant boot solution may also work off of a relatively high speed network, such as gigabit Ethernet or the like. In this alternative, a network device is asked to access a specific network resource, and transfer it via DMA into memory as generally described in the above solution.

With respect to entering a hibernate state, the hibernation file that contains the RAM contents at the time of hibernation is written into flash. For example, the BIOS may configure the contents of the RAM, such as into a compressed hibernation file in the RAM, and then via a single request to the controller 330 may transfer the hibernation file via DMA for persisting in the high speed nonvolatile storage device 200. Note that the large-sized transfers save a great deal of time in terms of overhead; for example with a single 2.6 gigabit PCIe line, 200 megabytes may be transferred to a two kilobyte, six-interface flash device with a single request from the perspective of the writer. As described above, the controller writes the six flash interfaces in parallel, essentially writing six times faster than a single device can be written.

With respect to resuming from a hibernate state, e.g., when a computer system resumed from the ACPI S4 sleep state, the hibernation file that contains the RAM contents at the time of hibernation is transferred back into main memory. This is accomplished very quickly (relative to a hard disk read) by having the device controller start a DMA engine for each memory device 320-325, for example.

Note that instead of being configured as a block mode device for hibernation, an alternative nonvolatile device may have an interface that in general saves the main system memory and then restores it. For example, a protocol may be implemented such that the system BIOS calls the interface, resulting in a snapshot of main memory transferred to and from the nonvolatile device, essentially having the BIOS perform a "quasi-S3" resume. In one example quasi-S3 scenario, the user or system may enter standby, and have a snapshot of the memory contents (which may be in the form of a hibernation file) automatically saved by the BIOS to the high speed non-volatile memory device. The BIOS can then perform operations such as to turn off system power after some time expires, and restore from the high speed non-volatile memory device if the power was turned off or otherwise lost, or restore from standby without reading back from the high speed non-volatile memory device if the power was not turned off. Via the BIOS, the user or system may also perform a standard S4 hibernation, e.g., by directly entering hibernation and restoring from hibernation.

Although any practical amount of non-volatile memory may be present in a device, to optimize boot and hibernation it is desirable to have enough memory capacity to hold the entire hibernation file and/or all or most of the boot files. For example, there may be approximately 128 or 256 megabytes available on the device, although for hibernation the nonvolatile amount may correspond to the size of the volatile memory contents when compressed. Larger capacity nonvolatile devices may persist boot and resume files.

By providing the controller to manage the interfaces in parallel, while at the same time having the controller partition a request thereby allowing only a single request to handle any arbitrary size write or read and thus eliminating overhead on the part of the main processor, significant speed gains are achieved. Notwithstanding, the main processor can break up a request as desired into virtual blocks for writing and later reading, such as on restore from hibernate, to begin executing some code that is first restored while other virtual blocks are still being transferred. Any practical number of virtual blocks may be maintained; note however that unlike a file system, the virtual block size is variable, corresponding to the request. As such, the write and read requesters need not be concerned with formatting the data for flash writes and reads.

Another usage model for a high speed nonvolatile memory device includes supplementing the main system volatile (e.g., DRAM) memory. For example, a relatively large cache may be provided by the device for swapping data in and out of main memory. In this example, the high speed, nonvolatile memory device may essentially serve such as an intermediate cache that reduces (and sometimes may eliminate) the need to access the hard disk for virtual memory swapping. The file system may also write files to the high speed, nonvolatile memory device. As can be readily appreciated, such example uses improve the performance of applications and other programs.

Yet another usage model for a high speed nonvolatile memory device is to provide a store for system components when the main system CPU is not on, or is otherwise occupied. For example, network cards, facsimile cards, auxiliary devices and so forth may each be configured to read and write data to the high speed nonvolatile memory device without requiring CPU assistance.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for writing data to a non-volatile memory device, wherein the memory device comprises a plurality of interfaces to a plurality of non-volatile storage devices, the method comprising:
    determining if a second non-volatile memory device is available;
    when a second non-volatile memory device is available, communicating with the second non-volatile memory device and coordinating data reading and writing with a controller of the second non-volatile memory device;
    determining a number of available interfaces from the plurality of interfaces;
    determining an amount of storage at each of the plurality of non-volatile storage devices which are accessible through the available interfaces;
    receiving a data transfer request for writing data to a non-volatile storage device, in which the data to be transferred is not required to match data format requirements of the nonvolatile storage device;
    receiving data corresponding to the request via a data transfer mechanism;
    buffering the data as it is received in a high-speed buffer working memory;
    when the high-speed buffer working memory is full, outputting a busy indication;
    selecting at least a first of the plurality of interfaces and a second of the plurality of interfaces;
    performing wear leveling for each of the plurality of non-volatile storage devices;
    interleaving the data such that blocks of data are written in parallel to a plurality of the non-volatile storage devices;
    translating the data for writing to the plurality of interfaces, including simultaneously writing one part of the data via one interface and writing another part of the data via at least one other interface;
    maintaining information in association with the data that tracks to which nonvolatile storage device interface each part of the data was written;
    upon writing the data to the plurality of storage device interfaces being successful, committing the information in association with the data to an index;
    persisting the index; and
    upon successful completion of each of the above acts, returning an indication of success.

2. The method of claim 1 wherein the receiving the data comprises receiving the data via a direct memory access transfer mechanism.

3. The method of claim 1 wherein translating the data includes buffering the data and writing an amount of the data based on a nonvolatile storage block size.

4. The method of claim 1 further comprising using the maintained information to read the data, including reading at least one part of the data via the interface by which that part of the data was written.

5. The method of claim 4 wherein receiving the data comprises receiving data corresponding to memory contents in conjunction with entering a reduced power state of a computer system, and wherein using the maintained information to read the data comprises restoring the memory contents at a later time.

6. The method of claim 4 wherein receiving the data comprises receiving boot-related information for a computer system, and further comprising, using at least part of the data that is read to boot a computer system.

7. The method of claim 1 wherein maintaining the information includes maintaining at least one offset value in association with a corresponding at least one part of the data that is written.

8. The method of claim 5 further comprising, determining an offset value for a block that corresponds to the part of the data, and writing the block at a location corresponding to the offset value.

9. In a computing environment, a system comprising:
    a plurality of nonvolatile storage device interfaces, each interface corresponding to a set of nonvolatile storage devices that is accessible via its corresponding interface; and
    a controller coupled to the nonvolatile storage via the plurality of interfaces, the controller including logic that:
        a) processes a write request that corresponds to a set of data, in which the set of data is larger than a nonvolatile storage block writing size, by determining a number of available non-volatile memory devices;
determining an amount of storage at each of the number of available non-volatile storage devices;
communicating among each of the number of non-volatile memory devices and coordinating data reading and writing with a controller of each of the number of non-volatile memory devices;
collecting the data in a receive buffer,
outputting a busy indication when the receive buffer is full,
selecting at least a first of the plurality of nonvolatile storage device interfaces and a second of the plurality of nonvolatile storage device interfaces,
performing wear leveling for each non-volatile storage device,
upon the receive buffer becoming full, interleaving writes between at least two of the interfaces, including simultaneously writing one part of the data via one interface while writing another part of the data via at least one other interface,
maintaining information in association with the data that is useable to subsequently determine by which interface each part of data was written,
upon the writes being successful, committing the information in association with the data in an index,
persisting the index and returning an indication of success, and
b) processes a read request that corresponds to the set of data by,
receiving the read request;
determining a correct index corresponding to the data, reading the index into working memory,
using the information maintained in the index to determine by which interface each part of data was written,
for each part, reading that part of the data via that interface into a buffer,
outputting the data from the buffer,
determining whether all data has been read and output, and
when all data has been read, outputting a completion signal.

10. The system of claim 9 wherein the controller is coupled to a main memory, and receives the data for writing by a direct memory access transfer from the main memory, and transfers data that is read by a direct memory access transfer to the main memory.

11. The system of claim 9 wherein the nonvolatile storage comprises flash memory.

12. The system of claim 9 wherein the controller is coupled to a main memory of a computer system, and wherein the controller processes the write request to persist data corresponding to main memory contents in conjunction with entering a reduced power state of a computer system, and wherein the controller processes the read request to restore the main memory contents at a later time.

13. The system of claim 9 wherein the controller processes the read request to output information used to boot a computer system.

14. A computer-readable storage medium having computer-executable instructions, which when executed perform steps, comprising:

determining a number of available non-volatile memory devices;
determining an amount of storage at each of the number of available non-volatile storage devices;
communicating among each of the number of non-volatile memory devices and coordinating data reading and writing with a controller of each of the number of non-volatile memory devices;
receiving a write request to store a set of data in non-volatile memory, in which the amount of data is arbitrary with respect to a block size for writing to the non-volatile memory;
collecting the data in a receive buffer;
when the receive buffer is full, outputting a busy indication;
when the receive buffer is full, writing the data;
interleaving block-sized subsets of the set of data to a plurality of interfaces to sets of non-volatile memory;
writing via at least two interfaces simultaneously;
maintaining information with respect to how the block-sized subsets are located among the sets of non-volatile memory;
upon successfully writing the data to the plurality of interfaces, committing the information in association with the data to an index;
persisting the index;
completing the write request by signaling that the write request is complete;
returning an indication of success;
receiving a read request to output at least part of the set of data after the write request is complete;
determining a correct index corresponding to the set of data;
reading the index into working memory;
using the maintained information, read from the index in working memory, to determine the one or more interfaces through which the data was written;
reading the requested data into a buffer;
outputting the requested data such that the requested data that is output is unchanged by the interleaving that occurred while processing the write request; and
completing the read request by signaling that the read request is complete.

15. The computer-readable storage medium of claim 14 wherein processing the write request includes receiving data via a direct memory access transfer mechanism, and wherein using the maintained information to output requested data includes outputting data via a direct memory access transfer mechanism.

16. The computer-readable storage medium of claim 14 wherein processing the write request corresponds to storing data corresponding to memory contents in conjunction with entering a reduced power state of a computer system, and wherein using the maintained information to output the requested data corresponds to restoring the memory contents at a resume time.

17. The computer-readable storage medium of claim 14 wherein using the maintained information to output the requested data corresponds to providing data used in booting a computer system.

18. The computer-readable storage medium of claim 14 wherein processing the write request corresponds to storing cached data and/or storing a file.

* * * * *